June 23, 1942.    F. C. FRANK    2,287,236
AIRPLANE WHEEL
Filed Jan. 12, 1940

INVENTOR.
FREDERICK C. FRANK.
BY Jerome D. Cox.
ATTORNEY.

Patented June 23, 1942

2,287,236

UNITED STATES PATENT OFFICE 2,287,236

AIRPLANE WHEEL

Frederick C. Frank, South Bend, Ind., assignor to Bendix Aviation Corporation, South Bend, Ind., a corporation of Delaware Application January 12, 1940, Serial No. 313,506

6 Claims. (Cl. 301—6)

This invention relates to vehicle wheels and brakes and more particularly to brakes which may be positioned within the wheels themselves. Such brakes may be positioned adjacent to the sides of the wheels so that the brakes may be protected by shields to prevent entrance of foreign matter such as dirt, oil, or water into the brake chamber.

An object of this invention is to maintain the braking facilities of vehicle wheels free from foreign substances.

Still another object of this invention is to provide inexpensive and positive means to maintain the vehicle wheel brake free of foreign substances.

A feature of the invention is the arrangement of the wheel, backing plate or dust shield and brake drum so as to form a tortuous passage to inhibit the entrance of foreign substances into the brake enclosure.

A further feature of this invention is the provision of slinger rings in spaced relation on the vehicle wheel with the dust cover or backing plate positioned therebetween.

Figure 1:
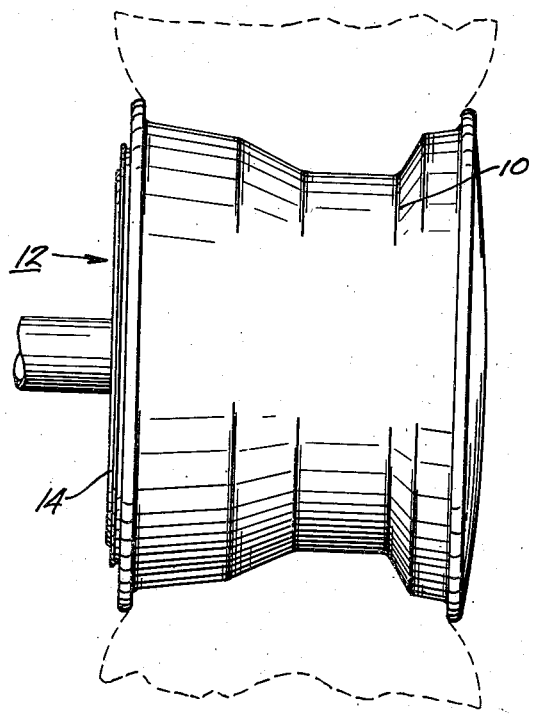
Figure 2:
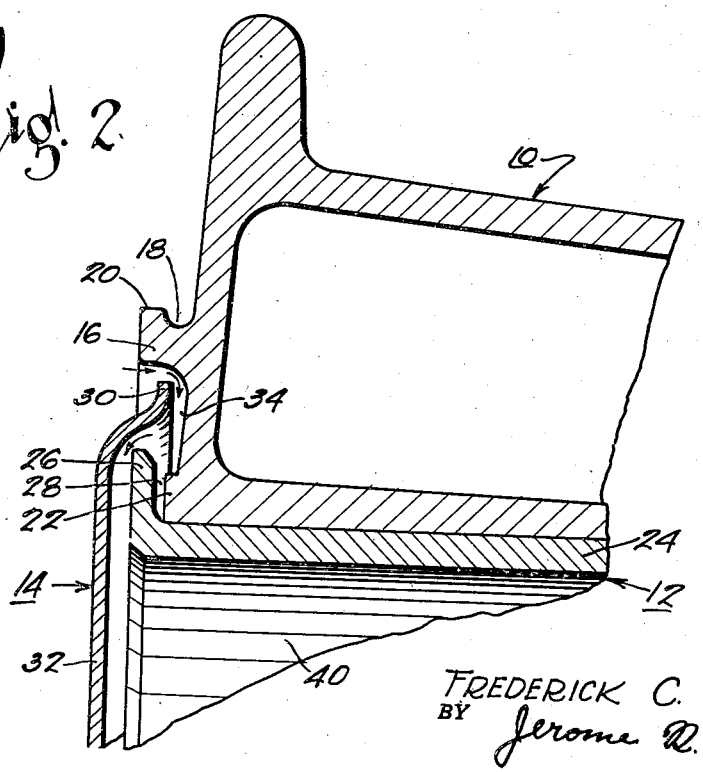

The above and other objects and features will be apparent upon reference to the following detailed description of my invention as shown in the accompanying drawing in which:

Figure 1 is a side view in elevation of a vehicle wheel, brake and dust cover assembled upon an axle; and Figure 2 is an enlarged fragmentary portion in section showing the tortuous passage provided to maintain the brake enclosure free of foreign substances.

Referring to the drawing Figure 1 shows a vehicle wheel 10 provided with a brake indicated generally by the numeral 12. The brake 12 is provided with a cover plate or backing plate 14.

From the enlarged fragmentary portion shown in Figure 2 it will be seen that the wheel 10 is provided, on the brake side, with an annular boss 16. The boss 16 is formed with a groove 18 on its outer periphery adjacent the wheel face and with an outwardly extending flange 20 at its outer extremity. The flange 20 serves as a slinger ring and is formed integral with the wheel. A second annular boss 22 also formed on the wheel face is concentric with the boss 16. The wheel 10 is also provided with a brake drum 24 which has a friction element, not shown, associated therewith and forming a part of the brake 12. The brake drum 24 has an outwardly extending flange 26 formed integral therewith to provide a second slinger ring. A groove 28 is formed by the clearance between the boss 22 and the flange 26 of the brake drum 24. Thus is provided a second groove and slinger ring similar to and concentric with the groove 18 and the slinger ring flange 20.

The cover plate 14, enclosing the brake mechanism, is provided with a flange 30 offset from a main portion 32. The flange 30 extends into an annular groove 34 formed by and between the two bosses 16 and 22 and the slinger rings or flanges 20 and 26. In assembling a wheel, a brake drum and a cover plate in the manner described above, a tortuous passage, having a reverse curve as indicated by arrows, is provided to preclude entrance of foreign substances into the brake chamber 40 within the brake drum 24.

In operation, with the wheel at rest, mud, water or oil splashed upon the wheel or tire surface above the horizontal center line will run down the side wall to accumulate in the groove 18 and thence around in the groove 18 to the lower side of the wheel from whence it will run down to the ground. Any foreign substance that may enter at the juncture between the flange 30 of the cover plate 14 and the boss 16 will accumulate in the groove 28 and follow the groove around and move downwardly to run out again at the lowermost portion of the opening and drip off from the lowermost portion of the flange 20 to the ground. Likewise any foreign substances splashed against the cover plate will run downwardly to accumulate and drip off of the lowermost portion thereof falling to the boss 16 and then off to the ground from the lowermost portion of the flange 20.

When the wheel 10 is rotating by reason of centrifugal force, the slinger ring 20 disposes of any accumulation of foreign substances in the groove 18 and likewise the slinger ring formed by the flange 26 of the brake drum 24 acts as an additional safeguard against entrance into the brake chamber 40 of any foreign substances which may accumulate in the grooves 28 or 34.

It is to be understood that the above description of my invention is for the purpose of illustration only and various changes may be made therein without departing from the spirit and scope of the invention as defined in the appended claims.

I claim:

1. A vehicle wheel having a plurality of annular bosses forming between them a recess external to the wheel, and a cover plate terminating in the recess formed between the bosses, said bosses being substantially L shaped in cross section.

2. A vehicle wheel having a brake, a boss on the wheel, a slinger ring flange integral with the said boss, a brake drum associated with the wheel, a slinger ring flange on the brake drum, the said slinger ring flanges forming between them a recess, and a cover plate for the brake having the outer extremity thereof extending into the recess formed between the slinger ring flanges.

3. A wheel assembly comprising a wheel portion, a brake drum portion and a cover plate portion, said wheel portion having a side face and having a pair of concentric circular flanges extending outward from the face, and one of said flanges being formed with a circular groove on the side thereof opposite to the axis of said wheel, said brake drum portion being formed generally as a cylinder but having a flange formed at the outer end of said cylinder extending away from the axis thereof and forming a recess with the two flanges of the wheel portion, said cover plate portion having an inwardly curved flange extending into the recess.

4. A wheel assembly comprising a wheel portion, a brake drum portion and a cover plate portion, said wheel portion having a side face and having a pair of concentric circular flanges extending outward from the face, and one of said flanges being formed with a circular groove on the side thereof opposite to the axis of said wheel and said brake drum portion being formed generally as a cylinder but having a flange formed at the outer end of said cylinder extending away from the axis thereof and forming a recess with the flanges of the wheel portion concentric with said groove.

5. A wheel assembly comprising a wheel portion, a brake drum portion and a cover plate portion, said wheel portion having a side face and having a pair of concentric circular flanges extending outward from the face and one of said flanges being formed with a circular groove on the side thereof opposite to the axis of said wheel, said cover plate portion having an inwardly curved flange extending into a recess formed between said wheel portion flanges.

6. In a wheel assembly, a wheel and drum portion having a plurality of annular flanges forming between them a recess external to the wheel and each forming a slinger ring groove opening radially away from the axis of the wheel and formed on the side of its respective flange away from the axis of the wheel, and a cover plate terminating in the recess formed between the flanges.

FREDERICK C. FRANK.